UNITED STATES PATENT OFFICE.

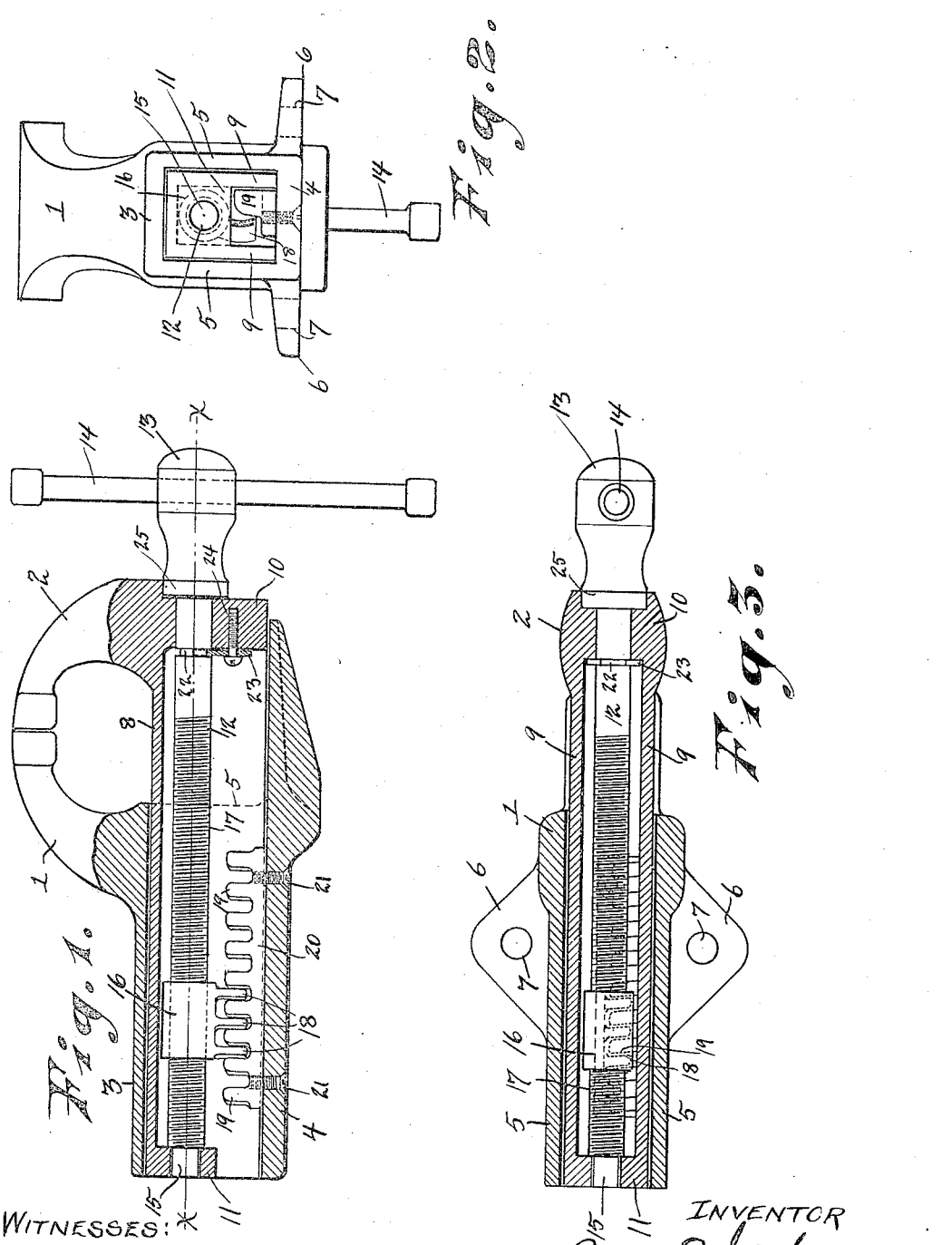

ROBERT E. JACK, OF MILWAUKEE, WISCONSIN, ASSIGNOR TO ADVANCE MANUFACTURING COMPANY, OF RACINE, WISCONSIN, A CORPORATION OF WISCONSIN.

QUICK-ACTING VISE.

1,125,329. Specification of Letters Patent. Patented Jan. 19, 1915.

Application filed July 19, 1912. Serial No. 710,390.

*To all whom it may concern:*

Be it known that I, ROBERT E. JACK, a citizen of the United States, residing at Milwaukee, county of Milwaukee, and State of Wisconsin, have invented new and useful Improvements in Quick-Acting Vises, of which the following is a specification.

My invention relates to improvements in so called quick-acting vises.

The object of my invention is, among other things—1st, to provide a device by which the jaws of a vise may be manually and quickly brought into contact with two opposite sides of the object to be held, and 2nd, to apply the power of a comparatively fine screw, the threads of which have a slight pitch, when forcing the jaws into gripping contact with the object to be held.

My invention is explained by reference to the accompanying drawings in which—

Figure 1 is a longitudinal vertical section thereof. Fig. 2 represents the rear end of the device shown in Fig. 1, and Fig. 3 is a horizontal section, drawn on line $x$—$x$ of Fig. 1.

Like parts are identified by the same reference numerals through the several views.

1 represents the stationary jaw of the vise, and 2 the movable jaw. The jaw 1 is formed integrally with the horizontal walls 3 and 4, vertical side walls 5, 5, and the base member 6, and such walls and base member are adapted to be rigidly secured to a bench by bolts in the ordinary manner, which are inserted through the apertures 7, 7, of said base member. The jaw 2 is formed integrally with the slidable member 8, vertical side members 9, 9, front end member 10, and rear end member 11.

12 is a clamping screw, which is provided on its protruding end with a head 13 and operating lever 14, and at its opposite end with a trunnion 15, operating in an aperture provided therefor in said end member 11.

16 is a nut, which has threaded bearings on the threaded bearings 17 of the clamping screw. The nut 16 is provided upon one side with a plurality of vertical teeth 18, which are adapted to engage with a series of vertical teeth 19, which vertical teeth are formed integrally with a fastening bar 20. The fastening bar 20 is adapted to be secured to the lower horizontal wall 4 by the fastening screws 21, 21, which screws pass through apertures provided therefor in the horizontal member 4 into threaded apertures formed in the bar 20. As the clamping screw 12 is turned backwardly, the nut 16 is adapted to turn therewith, whereby the teeth 18 are brought out of engagement with the series of teeth 19, and when this is done, the screw 12, together with the jaw 2 and other parts connected therewith, are adapted to be freely drawn outwardly and away from the stationary jaw 1, until said jaws are separated a distance corresponding with the dimensions of the object to be clamped. When the object to be clamped is placed between said jaws, the movable jaw 2 is forced back by backward pressure against the protruding end of the screw until the jaws are brought against the respective sides of such object, and when this is done, a circular movement is communicated to the screw 12 through the lever 14, whereby the nut 16 is turned with the screw 12 until the several teeth 18 are brought into engagement with the teeth of the series 19. When the teeth 18 have been thus brought into engagement with the series of teeth 19, the nut 16 is prevented from turning farther, when the movable jaw is forced rearwardly by the movement of the screw 12 through said nut 16, until the jaws 1 and 2 are caused to impinge firmly against the opposing sides of the object to be held. When it is desirable to remove the object thus held, the lever 14 is revolved a partial revolution in the opposite direction, whereby the screw 12 is turned back a slight distance in the nut 16, and whereby the teeth 18 are released from impinging contact with the series 19, when the nut 16 will thereafter turn freely with the clamping screw 12 until the teeth 18 are brought out of engagement with said series 19, and when this is done, the clamping jaw 2, together with the screw 12 and nut 16, are free to be drawn out from the inclosing walls which are formed integrally with the stationary jaw 1 until said jaws are separated the required distance. Thus it will be obvious that the same movement of the operating lever 14, which is required to turn the screw 12 forwardly in the nut 16, serves to engage the teeth 18 formed on said nut, with the series of teeth 19, and that by a reverse movement of said operating lever 14, said teeth 18 will be disengaged from said series of teeth 19, preparatory to separating the jaws.

To prevent the clamping screw 12 from being withdrawn from the aperture provided therefor in the vertical member 10, I provide said clamping screw with an annular groove 22 for the reception of the retaining plate 23 and the retaining plate is secured to the vertical member 10 by the screw 24, whereby it is obvious that as said screw is drawn outwardly in the act of separating the jaws, motion will be communicated therefrom to the jaw 2 through said plate 23, the upper end of which operates in the annular groove 22, as stated.

When closing the jaws of the vise, the annular hub 25 will be caused to bear against the opposing vertical sides of the member 10, whereby as backward pressure is applied to the operating lever 14 or to the protruding end of the clamping screw 12, said jaw 2 will be moved rearwardly or toward the opposing jaw until said jaws are thereby brought in contact with each other or with the object to be gripped.

Having thus described my invention, what I claim as new, and desire to secure by Letters Patent, is—

1. In a vise of the described class, the combination with a stationary jaw, a fastening plate, and a longitudinal series of vertical faced teeth, of a movable jaw, a screw revolubly supported in connection with said movable jaw, a revoluble nut having threaded bearings on and adapted to be turned a partial revolution with said screw, and a plurality of vertical faced teeth carried by said nut, said teeth being adapted as said nut and screw are turned, to be brought into and out of engagement with the vertical faced teeth of said stationary series.

2. In a vise of the described class, the combination with a stationary jaw, a fastening plate, a longitudinal series of vertical faced teeth and guide bearings for the movable jaw, of a movable jaw provided with guide bearings operating in the guide bearings of said stationary jaw, a screw revolubly supported in connection with said movable jaw, a nut having threaded bearings on and adapted to be turned a partial revolution with said screw, and a plurality of vertical faced teeth formed integrally with said nut, said teeth being adapted as said nut and screw are turned, to be brought into and out of engagement with the vertical faced teeth of said stationary series and to thereby prevent said nut from moving with said screw.

3. In a vise of the described class, the combination with a stationary jaw, a fastening plate, and a longitudinal series of vertical faced teeth, of a movable jaw, a screw revolubly supported in connection with said movable jaw provided with an annular recess, a nut having threaded bearings on and adapted to be turned a partial revolution with said screw, and a plurality of vertical faced teeth carried by said nut, said teeth being adapted as said nut and screw are turned, to be brought into and out of engagement with the vertical faced teeth of said stationary series, and a fastening plate rigidly connected with said movable jaw and adapted to bear at one end within the annular groove formed in said clamping screw, whereby said clamping screw is prevented from being withdrawn from the supporting bearings of said movable jaw.

4. In a vise of the described class, the combination of a stationary jaw, means for fastening said jaw to a stationary support, a longitudinal series of teeth rigidly connected with said stationary jaw, a movable jaw, a screw revolubly supported in connection with said movable jaw, a nut having threaded bearings on and adapted to revolve a partial revolution with said screw, and a plurality of vertical teeth formed integrally with said nut, the teeth on said nut being adapted as said nut and screw are turned, to be brought into and out of engagement with the vertical teeth of said stationary series, said screw being adapted when the teeth of said nut are in engagement with the teeth of said series, to be turned forwardly and rearwardly through said nut, whereby the movable jaw is brought into and out of rigid clamping engagement with said stationary jaw, or the object to be clamped by said jaws, all substantially as and for the purpose specified.

In testimony whereof I affix my signature in the presence of two witnesses.

ROBERT E. JACK.

Witnesses:
 JAS. B. ERWIN,
 I. D. BREMER.

Copies of this patent may be obtained for five cents each, by addressing the " Commissioner of Patents, Washington, D. C."